United States Patent [19]

Bruder

[11] B 3,927,406
[45] Dec. 16, 1975

[54] METHOD AND APPARATUS FOR OFF-BORESIGHT ANGLE CORRECTION FOR MONOPULSE RADARS WITH SLOW AGC NORMALIZATION

[75] Inventor: Joseph Albert Bruder, Snyder, N.Y.

[73] Assignee: Calspan Corporation, Buffalo, N.Y.

[22] Filed: Mar. 30, 1973

[21] Appl. No.: 346,487

[44] Published under the Trial Voluntary Protest Program on January 28, 1975 as document no. B 346,487.

[52] U.S. Cl. ............................................. 343/16 M
[51] Int. Cl.² .......................................... G01S 9/22
[58] Field of Search .................................. 343/16 M

[56] References Cited
UNITED STATES PATENTS

| | | | |
|---|---|---|---|
| 2,934,757 | 4/1960 | Hoefer et al. | 343/16 M |
| 3,599,208 | 8/1971 | Nelson | 343/16 M X |
| 3,703,003 | 11/1972 | Diamond | 343/16 M X |
| 3,720,941 | 3/1973 | Ares | 343/16 M X |

*Primary Examiner*—Malcolm F. Hubler
*Attorney, Agent, or Firm*—Allen J. Jaffe

[57] ABSTRACT

A method of and apparatus for permitting the instantaneous determination of the off-boresight angle in monopulse tracking radars employing a slow AGC normalization.

10 Claims, 2 Drawing Figures

METHOD AND APPARATUS FOR OFF-BORESIGHT ANGLE CORRECTION FOR MONOPULSE RADARS WITH SLOW AGC NORMALIZATION

In some conventional monopulse tracking radars a slow automatic gain control (AGC) normalization system is employed. The use of an AGC normalization system is desirable because of fluctuations which occur in the echo strength of the signal reflected from the target due to the constantly changing position and orientation of the target. The use of a slow AGC normalization system, however, presents difficulties where the signal processing techniques are based upon the instantaneous value of the off-boresight angle.

It is an object of this invention to provide an improved circuit for permitting the instantaneous determination of the off-boresight angle in monopulse radar systems employing a slow AGC normalization.

It is a further object of this invention to compensate the detected output of an intermediate frequency (IF) amplifier which is normalized by a slow AGC loop.

These objects, and others as will become apparent hereinafter, are accomplished by the present invention.

In a 2-horn monopulse radar the elevation off-boresight angle ($\beta$) is given by the equation $\beta = |\Delta| \cos \phi / |\Sigma|$, where $\Sigma$ is the vector sum of the signals in the two horns, $\Delta$ is the vector difference of the signals in the two horns and $\phi$ is the vector angle between the $\Sigma$ and $\Delta$ signals at the intermediate frequency. In a 4-horn monopulse radar the elevation off-boresight angle ($\beta$) is given by the equation $\beta = |\Delta| \cos \phi_\beta / |\Sigma|$, where $\Sigma$ is the vector sum of the signals in the four horns, $\Delta_\beta$ is the vector sum of the signals in the top two horns minus the vector sum of the signals in the bottom two horns and $\phi_\beta$ is the vector angle between the $\Sigma$ and $\Delta_\beta$ signals at the intermediate frequency. Similarly, the azimuth off-boresight angle ($\theta$) of a 4-horn monopulse radar is given by the equation $\theta = |\Delta_\theta| \cos \phi_\theta / |\Sigma|$, where $\Sigma$ is the vector sum of the signals in the four horns, $\Delta_\theta$ is the vector sum of the signals in the horns on the left side minus the vector sum of the signals in the horns on the right side and $\phi_\theta$ is the vector angle between the $\Sigma$ and $\Delta_\theta$ signals at the intermediate frequency.

A common method for providing this division process is to normalize the gain in the $\Sigma$ and $\Delta$ intermediate frequency (IF) amplifiers with a common AGC voltage ($V_{AGC}$) which is controlled by the $\Sigma$ IF amplifier output in such a manner as to keep the output of the $\Sigma$ IF amplifier constant. In effect, then, the gain of the $\Sigma$ and $\Delta$ IF amplifiers is essentially inversely proportional to $\Sigma$, and the $\Delta$ IF amplifier output is proportional to $\Delta/\Sigma$. However, in slow AGC normalization systems the AGC voltage is controlled by a boxcarred $\Sigma$ signal at the target range, and this boxcarred signal is then low-pass filtered. Essentially, then, the $\Delta$ IF output is normalized to $\Delta/\Sigma$ on the average, but any instantaneous $\Delta$ IF output may be different than the true $\Delta/\Sigma$ since the slow AGC normalization requires many pulses to achieve correction of a rapid change in the $\Sigma$ signal. Thus where signal processing techniques are based upon the instantaneous value of $\Delta/\Sigma$ and are applied to radar systems with slow AGC normalization, signal processing errors can be introduced.

Basically the present invention provides a method of and apparatus for off-boresight angle correction in a 2-horn monopulse radar employing a slow AGC normalization which comprises means for and the steps of receiving and amplifying first and second signals, detecting and boxcarring the amplified first signal, using the boxcarred first signal in an AGC circuit to control the gain in the amplifying of the first and second signals, detecting and boxcarring the amplified second signal responsive to the phase, and dividing the boxcarred second signal by the boxcarred first signal.

BRIEF DESCRIPTION OF THE DRAWINGS

For a fuller understanding of the present invention reference should now be had to the following detailed description thereof taken in conjunction with the accompanying drawings wherein.

DESCRIPTION OF THE PREFERRED EMBODIMENTS

Figure 1:
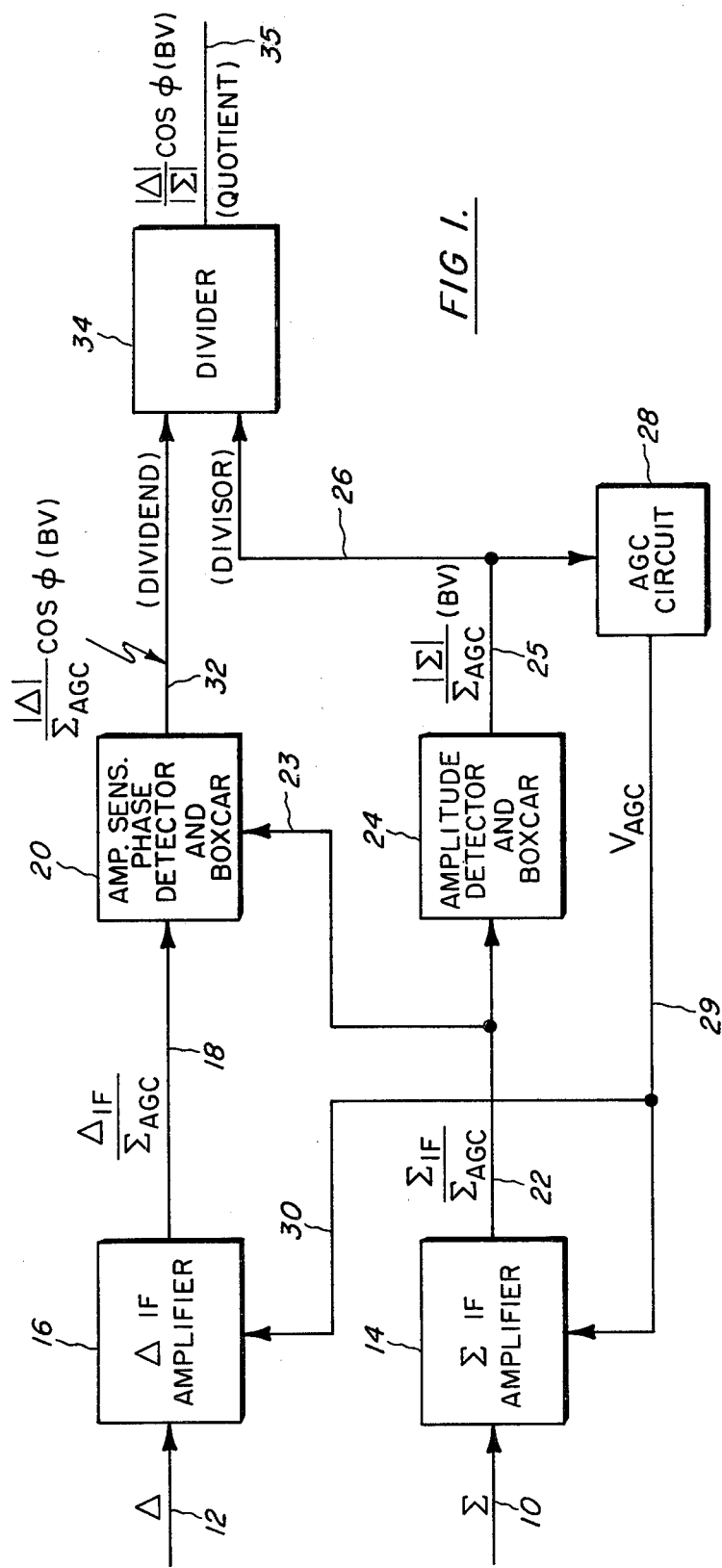
FIG. 1 shows a schematic representation of a circuit for compensating the detected output of an IF amplifier which is normalized by a slow AGC loop in a 2-horn radar system.

In a 2-horn monopulse radar system, as shown in FIG. 1, the signals in the two horns are added vectorially to produce a signal, $\Sigma$, and are subtracted vectorially to produce a signal, $\Delta$. The $\Sigma$ and $\Delta$ signals are obtained from a monopulse (2-channel) receiver (not shown) with the $\Sigma$ signal being transmitted via line 10 to a $\Sigma$ IF amplifier 14 and the $\Delta$ signal being transmitted via line 12 to a $\Delta$ IF amplifier 16. The amplified output of $\Delta$ IF amplifier 16, $\Sigma_{IF}/\Sigma_{AGC}$, is transmitted via line 18 to provide a first input to amplitude sensitive phase detector and boxcar 20. The amplified output of the $\Sigma$ IF amplifier 14, $\Sigma_{IF}/\Sigma_{AGC}$, is transmitted via line 22 to amplitude detector and boxcar 24 and via lines 22 and 23 to provide a second input to amplitude sensitive phase detector and boxcar 20. The boxcarred video (BV) output of amplitude detector and boxcar 24, $\Sigma/\Sigma_{AGC}$ (BV), is transmitted over lines 25 an 26 to AGC circuit 28. The output of AGC circuit 28, $V_{AGC}$, controls the gain of the IF amplifiers via lines 29 and 30. The signal $V_{AGC}$ acts to adjust the gain of the $\Sigma$ IF amplifier 14 to keep the detected signal $\Sigma_{IF}/\Sigma_{AGC}$, at a constant voltage and also acts to normalize the $\Delta$ IF amplifier 16.

In a slow AGC system, however, there is a time lag in adjusting the gain so that instantaneous changes in the $\Sigma$ signal level will cause the detected signal output, $\Sigma_{IF}/\Sigma_{AGC}$, to be different than the desired constant voltage. The detected output will then be proportional to $\Sigma/\Sigma_{AGC}$, where $\Sigma_{AGC}$ is that $\Sigma$ signal level which would cause the desired constant voltage output for that instantaneous AGC voltage. Since the $\Delta$ IF amplifier 16 is also normalized by the same AGC voltage, the output from the amplitude sensitive phase detector and boxcar 20 will be proportional to $|\Delta| \cos \phi / \Sigma_{AGC}$. For target returns with rapid amplitude fluctuations, this AGC normalization technique will yield $\Delta \cos \phi$ signal outputs which will deviate from the desired $|\Delta| \cos \phi / |\Sigma|$ signal.

Correction of the time lag induced errors associated with slow AGC normalization may be achieved as follows: the boxcarred video output of amplitude sensitive phase detector and boxcar 20, $|\Delta| \cos \phi (BV)/\Sigma_{AGC}$, is transmitted via line 32 as the dividend input of a divider 34 and the boxcarred video output of amplitude detector and boxcar 24, $|\Sigma|(BV)/\Sigma_{AGC}$ is transmitted via lines 25 and 26 as the divisor input of divider 34. Division by divider 34 eliminates the AGC normalization term, $\Sigma_{AGC}$, and the quotient, $|\Delta|\cos\phi(BV)/|\Sigma|$, a signal proportional to $\Delta/\Sigma$, is transmitted on line 35 to the signal processing devices (not shown).

Figure 2:
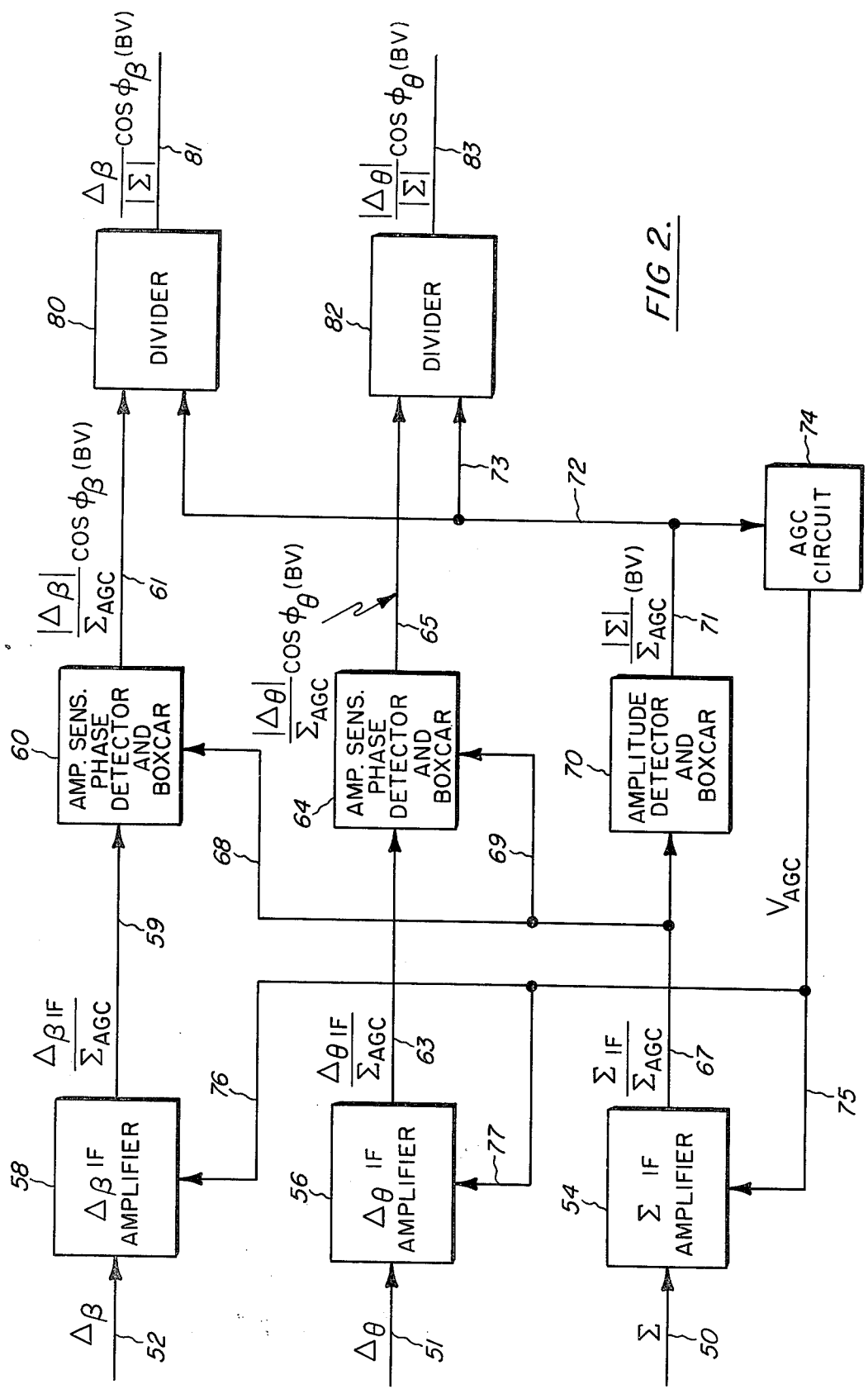
FIG. 2 shows a schematic representation of a circuit for compensating the detected output of an IF amplifier which is normalized by a slow AGC loop in a 4-horn radar system.

In a 4-horn monopulse radar system, as shown in FIG. 2, the signals in the four horns are added vectorially to produce a signal, $\epsilon$, and the vector differences in the azimuth and elevation planes are each added to produce signals, $\Delta_\beta$ and $\Delta_\theta$, representing the vector differences in the azimuth and elevation planes, respectively. The $\Sigma$, $\Delta_\beta$ and $\Delta_\theta$ signals are obtained from a monopulse (4-channel) receiver (not shown) with the $\Sigma$ signal being transmitted via line 50 to a $\Sigma$ IF amplifier 54, the $\Delta_\theta$ signal being transmitted via line 51 to $\Delta_\theta$ IF amplifier 56, and the $\Delta_\beta$ signal being transmitted via line 52 to $\Delta_\beta$ IF amplifier 58. The amplified output of $\Delta_\beta$ IF amplifier 58, $\Delta_{\beta\ IF}/\Sigma_{AGC}$, is transmitted via line 59, to provide a first input to amplitude sensitive phase detector and boxcar 60. The amplified output of $\Delta_\theta$ IF amplifier 56, $\Delta_{\theta\ IF}/\Sigma_{AGC}$, is transmitted via line 63 to provide a first input to amplitude sensitive phase detector and boxcar 64. The amplified output of the $\Sigma$ IF amplifier 54 $\Sigma_{IF}/\Sigma_{AGC}$, is transmitted via line 67 to amplitude detector and boxcar 70 and via lines 67, 68 and 69 to provide second inputs to amplitude sensitive phase detectors and boxcars 60 and 64. The boxcarred video (BV) output of amplitude detector and boxcar 70, $|\Sigma|/\Sigma_{AGC}$ (BV), is transmitted over lines 71 and 72 to AGC circuit 74. The output of AGC circuit 74, $V_{AGC}$, controls the gain of the IF amplifiers via lines 75, 76 and 77. The signal $V_{AGC}$ acts to adjust the gain of the $\Sigma$ IF amplifier 54 to keep the detected signal, $\Sigma_{IF}/\Sigma_{AGC}$, at a constant voltage and also acts to normalize the $\Delta_\beta$ and $\Delta_\theta$ IF amplifiers 56 and 58.

In a slow AGC system, however, there is a time lag in adjusting the gain so that instantaneous changes in the $\Sigma$ signal level will cause the detected signal output, $\Sigma_{IF}/\Sigma_{AGC}$, to be different than the desired constant voltage. The detected output will be proportional to $|\Sigma|/\Sigma_{AGC}$, where $\Sigma_{AGC}$ is that $\Sigma$ signal level which would cause the desired constant voltage output for that instantaneous AGC voltage. Since the $\Delta_\beta$ and $\Delta_\theta$ IF amplifiers 58 and 56 are also normalized by the same AGC voltage, the outputs from the amplitude sensitive detectors and boxcars 60 and 64 will be proportional to $|\Delta_\beta|\cos\phi_\beta/\Sigma_{AGC}$ and $|\Delta|\cos\phi_\theta\Sigma/\Sigma_{AGC}$ respectively. For target returns with rapid amplitude fluctuations, this AGC normalization technique will yield $|\Delta|\cos\phi$ outputs which will deviate from the desired $|\Delta|\cos\phi|_\theta|$ signal.

Correction of the time lag induced errors associated with slow AGC normalization may be achieved as follows: the boxcarred video output of amplitude sensitive phase detector and boxcar 60, $|\Delta_\beta|\cos\phi_\beta$ (BV) $/\Sigma_{AGC}$, is transmitted via line 61 as the dividend input of divider 80 and the boxcarred video output of amplitude detector and boxcar 70, $|\Sigma|/\Sigma_{AGC}$ (BV), is transmitted via lines 71 and 72 as the divisor input of divider 80. Division by divider 80 eliminates the AGC normalization term, $\Sigma_{AGC}$, and the quotient, $|\Delta_\beta|\cos\phi_\beta$ (BV) $/\Sigma$, representing the elevation off-boresight angle, $\beta$, is transmitted on line 81 to the signal processing devices (not shown). Similarly, the boxcarred video output of amplitude sensitive phase detector and boxcar 64, $|\Delta_\theta|\cos\phi_\theta$ (BV)$/\Sigma_{AGC}$, is transmitted via line 65 as the dividend input of divider 82 and the boxcarred video output of amplitude detector and boxcar 70, $|\Sigma|/\Sigma_{AGC}(BV)$, is transmitted via lines 71, 72 and 73 as the divisor input of divider 82. Division by divider 82 eliminates the AGC normalization term, $\Sigma_{AGC}$, and the quotient, $|\Delta_\theta|\cos\phi_\theta(BV)/\Sigma$, representing the azimuth off-boresight angle, $\theta$, is transmitted on line 83 to the signal processing devices (not shown).

Although preferred embodiments of the present invention have been illustrated and described, other changes will occur to those skilled in the art. It is therefore intended that the scope of the present invention is to be limited only by the scope of the appended claims.

I claim:

1. A method for off-boresight angle correction in a 2-horn monopulse radar employing a slow AGC normalization including the steps of:
    receiving a first signal representing the vector sum of the signals in the two horns;
    receiving a second signal representing the vector difference of the signals in the two horns;
    amplifying said first and second signals;
    detecting and boxcarring said amplified first signal;
    using said boxcarred first signal in an AGC circuit to control the gain in the amplifying of said first and second signals;
    detecting and boxcarring said amplified second signal responsive to the phase of said amplified first signal; and
    dividing said boxcarred second signal by said boxcarred first signal whereby the off-boresight angle is determined independent of the influence of said AGC circuit.

2. A method for off-boresight angle correction in a 4-horn monopulse radar employing a slow AGC normalization including the steps of:
    receiving a first signal representing the vector sum of the signals in the four horns;
    receiving a second signal representing the vector sum of the signals in the two horns on the left side minus the vector sum of the signals in two horns on the right side;
    receiving a third signal representing the vector sum of the signals in the top two horns minus the vector sum of the signals in the bottom two horns;
    amplifying said first, second and third signals;
    detecting and boxcarring said amplified first signal;
    using said boxcarred first signal in an AGC circuit to control the gain in amplifying said first, second and third signals;
    detecting and boxcarring said amplified second and third signals responsive to the phase of said amplified first signal;
    dividing said boxcarred second signal by said boxcarred first signal; and
    dividing said boxcarred third signal by said boxcarred first signal, whereby the azimuth and elevation off-boresight angles are determined independent of the influence of said AGC circuit.

3. A circuit for off-boresight angle correction in a 2-horn monopulse radar employing a slow AGC normalization including:
    first means for receiving and amplifying a first signal representing the vector sum of the signals in the two horns;
    second means for receiving and amplifying a second signal representing the vector difference of the signals in the two horns;

means for detecting and boxcarring said amplified first signal;

AGC circuit means for controlling the gain in said first and second means responsive to the boxcarred first signal;

means for detecting and boxcarring said amplified second signal responsive to the phase of said amplified first signal; and means for dividing said boxcarred second signal by said boxcarred first signal whereby said off-boresight angle is determined independent of the influence of said AGC circuit means.

4. The circuit of claim 3 wherein said first and second means include IF amplifiers.

5. The circuit of claim 3 wherein said means for detecting and boxcarring said amplified first signal includes an amplitude detector and boxcar.

6. The circuit of claim 3 wherein said means for detecting and boxcarring said amplified second signal responsive to the phase includes an amplitude sensitive phase detector and boxcar.

7. A circuit for off-boresight angle correction in a 4-horn monopulse radar employing a slow AGC normalization including:

first means for receiving and amplifying a first signal representing the vector sum of the signals in the four horns;

second means for receiving and amplifying a second signal representing the vector sum of the signals in the two horns on the left side minus the vector sum of the signals in the two horns on the right side;

third means for receiving and amplifying a third signal representing the vector sum of the signals in the top two horns minus the vector sum of the signals in the bottom two horns;

means for detecting and boxcarring said amplified first signal;

AGC circuit means for controlling the gain in said first, second and third means responsive to the boxcarred first signal;

means for detecting and boxcarring said amplified second and third signals responsive to the phase of said amplified first signal;

means for dividing said boxcarred second signal by said boxcarred first signal; and means for dividing said boxcarred third signal by said boxcarred first signal, whereby the azimuth and elevation off-boresight angles are determined independent of the influence of said AGC circuit means.

8. The circuit of claim 7 wherein said first, second and third means include IF amplifiers.

9. The circuit of claim 7 wherein said means for detecting and boxcarring said amplified first signal includes an amplitude detector and boxcar.

10. The circuit of claim 7 wherein said means for detecting and boxcarring said amplified second and third signals responsive to the phase include amplitude sensitive phase detectors and boxcars.

* * * * *